3,194,668
PROCESS FOR PREPARING RADIATION STABILIZED POLYETHYLENE AND FOOD PACKAGE UTILIZING SAME
Herbert N. Schlein, Framingham, and Bernard R. La Liberte, Wayland, Mass., assignors to the United States of America as represented by the Secretary of the Army
No Drawing. Filed Apr. 8, 1963, Ser. No. 271,523
6 Claims. (Cl. 99—171)
(Granted under Title 35, U.S. Code (1952), sec. 266)

The invention described herein, if patented, may be manufactured and used by or for the Government for governmental purposes without the payment to us of any royalty thereon.

This invention relates to polyethylene stabilized against odor formation resulting from exposure to high energy ionizing radiation and more particularly to a method of preventing objectionable odor formation in polyethylene resulting from exposure to high energy ionizing radiation, to radiation stabilized polyethylene compositions and to food packages utilizing a radiation stabilized polyethylene envelope or barrier which package is subjected to a food sterilizing dose of high energy ionizing radiation.

Of the many polymeric film materials used in the packaging of foodstuffs, polyethylene because of its excellent physical characteristics has proven to be the most suitable material for this purpose. Polyethylene films utilized in food packaging are inexpensive, highly transparent, strong, flexible, easily heat-sealed, and impermeable to moisture. However, when used to package foodstuffs which are to be processed by exposure to high energy ionizing radiation, polyethylene has proved to be completely unsatisfactory. It has been observed that radiation in amounts sufficient to sterilize food packaged in polyethylene produces in the polyethylene a strong and offensive odor which upon storage will permeate the food and is otherwise intolerable in a food package.

Other polymeric films which do not produce odors in response to high energy ionizing radiation, such as polyamides and polystyrenes, have deficiencies in their physical properties which militate against their use as the sole food packaging material. Polyethylene remains the one best material for food packaging because of its superior heat sealing and water barrier properties and any deficiencies in its properties for special purposes can be overcome by coating or laminating with a material possessing the special property. Since it appears to be essential that polyethylene be a necessary constituent of any inexpensive transparent film barrier for foodstuffs some way must be found to alter the response of polyethylene to radiation without appreciably affecting the desirable physical properties thereof.

According to the present invention we have found that the addition of a minor amount of 2,2'-methylene-bis-(4-ethyl-6-t-butyl phenol) to polyethylene will stabilize the latter so that when subjected to high energy ionizing radiation in the food sterilization dose range and even higher there is no odor formation. In addition to preventing radiation odor, the above additive is completely compatible with polyethylene, will not leach out with water and exhibits low migration into food products.

Polyethylene of any nature may be advantageously used in the present invention. The polymers of ethylene which are suitable for use include low, medium and high density polyethylenes as well as copolymers of ethylene.

EXAMPLE I

There was added to 100 grams of polyethylene resin (density 0.915 and melt index 2.1) 5 grams of 2,2'-methylene-bis-(4-ethyl-6-t-butyl phenol). This mixture was milled together for 5 minutes at a temperature of 230° F. and the resulting blend was pressed into films on a 6½ inch press at a pressure of 20 tons with a temperature of 200° F. for one minute. A 5 gram sample of the film was completely enclosed and sealed in a 0.5 mil aluminum foil pouch approximately 6 by 4 inches in size. The sealed pouch was placed on a conveyor and passed under a Van de Graaf electron beam accelerator operating at 1 million electron volts and 75 microamperes until the sample received a dosage of 5 megarads. The pouch was then opened and the sample examined and found to be free of any odor. A control sample of the same resin without the additive was treated in exactly the same manner and upon examination found to have a very strong and disagreeable odor.

EXAMPLE II

The procedure of Example I is repeated except that 0.1 gram of 2,2'-methylene-bis-(4-ethyl-6-t-butyl phenol) is added to 100 grams of the resin. One sample of the film received a dose of 5 megarads and a second sample received 10 megarads. Both samples upon examination were found to be odor free. Duplicates of the above irradiated samples were found to be odor free after 4 weeks' storage.

EXAMPLE III

The procedure of Example II is repeated replacing the polyethylene resin with an equivalent amount of a copolymer of 95% ethylene and 5% butene (density 0.950 and melt index 3.2). No odor was observed in samples exposed to 5 or 10 megarads of radiations both immediately after exposure and after 4 weeks of storage.

EXAMPLE IV

A 20 gm. slice of raw beef having a thickness of 0.25 cm. was placed in an open-ended transparent polyethylene pouch and the open end was heat-sealed. The pouch was formed of 1.0 mil polyethylene film (density 0.915 and melt index 2.1) containing 0.1 percent by weight of 2,2'-methylene-bis-(4-ethyl-6-t-butyl phenol). The pouch was then exposed to 5 megarads of irradiation from an electron beam accelerator operating at 1 million electron volts which dosage was sufficient to sterilize the contents of the pouch. Examination of the irradiated polyethylene pouch revealed no trace of odor whereas a control pouch (no additive) treated in the same fashion did give off a strong "radiation" odor.

The additive employed in the present invention has been found to be effective in inhibiting odor formation in amounts as low as 0.1 percent by weight of the polyethylene at dose rates as high as 10 megarads.

The ability of 2,2'-methylene-bis-(4-ethyl-6-t-butyl phenol) to stabilize polyethylene to resist odor formation upon exposure to high energy ionizing radiation is all the more unexpected when it is considered that the next adjacent lower homolog 2,2'-methylene-bis-(4-methyl-6-t-butyl phenol) was found to be completely unsatisfactory for this purpose. For purposes of comparison, polyethylene film samples were prepared by the technique set forth in Example I containing either 5 percent by weight of 2,2'-methylene-bis-(4-methyl-6-t-butyl phenol) or 5 percent by weight of 2,2'-methylene-bis-(4-ethyl-6-t-butyl phenol) or in the case of the control, no additive. The samples were exposed to radiation from a 1 million electron volt electron beam accelerator with the samples receiving either a 5 megarad or 10 megarad dose. The samples were analyzed by a trained panel of observers and the result of their evaluation set forth in the table below.

Table

| Additive | Radiation Dose | |
|---|---|---|
| | 5 megarad | 10 megarad |
| 2,2'-methylene-bis-(4-methyl-6-t-butyl phenol). | Strong odor | Very strong odor. |
| 2,2'-methylene-bis-(4-ethyl-6-t-butyl phenol). | No odor | No odor. |
| None | Strong odor | Very strong odor. |

From the foregoing test the superiority of 2,2'-methylene-bis-(4-ethyl-6-t-butyl phenol) is clearly apparent. The 2,2'-methylene-bis-(4-methyl-6-t-butyl-phenol), on the contrary, is completely unsatisfactory and in fact no better than the polyethylene control.

We claim:

1. A food package comprising food and a sealed envelope of polyethylene film surrounding said food, said polyethylene film having incorporated therein an amount of 2,2'-methylene-bis-(4-ethyl-6-t-butyl phenol) effective to render said polyethylene film resistant to odor formation from the conjoint exposure of said sealed envelope and of said food contained therein to a food-sterilizing dose of high energy ionizing radiation.

2. A food package according to claim 1 wherein said polyethylene film contains at least 0.1% by weight of said 2,2'-methylene-bis-(4-ethyl-6-t-butyl phenol).

3. A food package according to claim 1 wherein said polyethylene film contains from 0.1% to 5.0% by weight of said 2,2'-methylene-bis-(4-ethyl-6-t-butyl phenol).

4. Process of preventing odor formation resulting from the exposure of polyethylene to high energy ionizing radiation when foodstuffs are subsequently sterilized therein which comprises incorporating with said polyethylene an effective amount of 2,2'-methylene-bis-(4-ethyl-6-t-butyl phenol) and exposing said polyethylene containing said 2,2'-methylene-bis-(4-ethyl-6-t-butyl phenol) to a food sterilizing dose of high energy ionizing radiation.

5. Process of preventing odor formation resulting from the exposure of polyethylene to high energy ionizing radiation when foodstuffs are subsequently sterilized therein which comprises incorporating with said polyethylene at least 0.1% by weight of 2,2'-methylene-bis-(4-ethyl-6-t-butyl phenol) and exposing said polyethylene containing said 2,2'-methylene-bis-(4-ethyl-6-t-butyl phenol) to a food sterilizing dose of high energy ionizing radiation.

6. Process according to claim 5 wherein said 2,2'-methylene-bis-(4-ethyl-6-t-butyl phenol) is added in an amount of about 0.1 to 5.0% by weight.

References Cited by the Examiner

UNITED STATES PATENTS

| | | | |
|---|---|---|---|
| 2,675,366 | 4/54 | Pullman | 260—45.95 |
| 2,878,174 | 3/59 | Rainer et al. | |
| 2,968,630 | 1/61 | Pillon et al. | 260—45.95 XR |
| 2,970,128 | 1/61 | Csendes | 260—45.95 XR |
| 2,985,617 | 5/61 | Salyer et al. | 260—45.9 XR |
| 2,999,842 | 9/61 | Csendes | 260—45.95 |
| 3,017,443 | 1/62 | Chenicek et al. | 252—404 |
| 3,028,363 | 4/62 | Robbins et al. | 260—45.95 XR |
| 3,043,672 | 7/62 | Ecke et al. | 260—45.95 XR |
| 3,082,188 | 3/63 | Dietzler et al. | 260—45.95 XR |
| 3,124,555 | 3/64 | Bown et al. | 260—45.95 XR |
| 3,146,273 | 8/64 | Orloff et al. | 260—45.95 XR |

A. LOUIS MONACELL, *Primary Examiner.*

RAYMOND N. JONES, *Examiner.*